United States Patent
Bai et al.

(10) Patent No.: US 12,399,032 B2
(45) Date of Patent: Aug. 26, 2025

(54) METHOD AND SYSTEM OF INCONSISTENT MAP DATA RECONCILIATION IN CONNECTED VEHICLES

(71) Applicant: GM Global Technology Operations LLC, Detroit, MI (US)

(72) Inventors: Fan Bai, Ann Arbor, MI (US); Mason David Gemar, Cedar Park, TX (US); Vivek Vijaya Kumar, Shelby Township, MI (US); Joon Hwang, Pflugerville, TX (US); Bo Yu, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 303 days.

(21) Appl. No.: 18/149,427

(22) Filed: Jan. 3, 2023

(65) Prior Publication Data
US 2024/0219201 A1    Jul. 4, 2024

(51) Int. Cl.
*G01C 21/00* (2006.01)
*G06V 20/56* (2022.01)

(52) U.S. Cl.
CPC ..... *G01C 21/3859* (2020.08); *G01C 21/3841* (2020.08); *G06V 20/56* (2022.01)

(58) Field of Classification Search
CPC ............ G01C 21/3859; G01C 21/3841; G01C 21/3848; G01C 21/32; G06V 20/05; G06V 20/56

(Continued)

(56) References Cited

U.S. PATENT DOCUMENTS

| | | | | |
|---|---|---|---|---|
| 6,125,339 A | * | 9/2000 | Reiser | G06N 20/00 702/123 |
| 2003/0191610 A1 | * | 10/2003 | Chen | G06F 18/25 702/191 |

(Continued)

FOREIGN PATENT DOCUMENTS

| | | | | | |
|---|---|---|---|---|---|
| CN | 109564099 A | * | 4/2019 | | G01C 21/30 |
| DE | 102019131637 A1 | * | 5/2021 | | |

OTHER PUBLICATIONS

Na, Data Fusion—A eview, US Department of Defense (Year: 1990).*

(Continued)

*Primary Examiner* — Ramya P Burgess
*Assistant Examiner* — Preston Jay Miller
(74) *Attorney, Agent, or Firm* — Vivacqua Crane, PLLC

(57) ABSTRACT

A method and system of map data reconciliation in connected vehicles. The method includes processing information to detect a same object; determining an identification of the same object; determining a confidence level of the identification of the same object; determining a probability mass function (PMF) of the identification of the same object using Dempster-Shafer Theory; determining a most probably identification of the same object based on the PMF; and communicating the most probably identification of the same object to a vehicle to implement a vehicle function. The system includes a conflict resolution module configured to receive confidence levels from multiple vehicles detecting the same object and to determine a reconciled identification of the same object using an algorithm based on Dempster-Shafer Theory, and a weight calculation module configured to apply a weight function based on a scene context weight function and on a historical score of the vehicles.

20 Claims, 7 Drawing Sheets

(58) Field of Classification Search
USPC .......................................................... 701/400
See application file for complete search history.

(56) References Cited

U.S. PATENT DOCUMENTS

| | | | | |
|---|---|---|---|---|
| 2005/0177290 | A1* | 8/2005 | Farmer | G06V 10/768 |
| | | | | 701/45 |
| 2006/0052923 | A1* | 3/2006 | Farmer | B60R 21/01538 |
| | | | | 701/45 |
| 2010/0250106 | A1* | 9/2010 | Bai | G08G 1/096791 |
| | | | | 701/117 |
| 2012/0005149 | A1* | 1/2012 | Chen | G06N 5/04 |
| | | | | 706/52 |
| 2014/0336866 | A1* | 11/2014 | Kloeden | G08C 25/00 |
| | | | | 701/30.3 |
| 2018/0023961 | A1* | 1/2018 | Fridman | H04N 23/90 |
| | | | | 382/104 |
| 2019/0162818 | A1* | 5/2019 | Grandin | G01S 7/021 |
| 2020/0047748 | A1* | 2/2020 | Komori | B60W 30/09 |
| 2021/0018322 | A1* | 1/2021 | Jiang | G06F 16/9024 |
| 2021/0073321 | A1* | 3/2021 | Steyer | G06V 20/58 |
| 2023/0297670 | A1* | 9/2023 | Qi | G06F 21/552 |
| 2023/0314599 | A1* | 10/2023 | Jia | G01S 13/726 |
| | | | | 701/28 |

OTHER PUBLICATIONS

Murphy et al., Dempster-Shafer Theory for Sensor Fusion in Autonomous Mobile Robots, Apr. 1998, IEEE Transactions on Robotics and Automation, vol. 14, No. 2 (Year: 1998).*
Sentz et al., Combination of Evidence in Dempster-Shafer Theory, Apr. 2002, Sandia National Laboratories (Year: 2002).*
Na, Data Fusion—A Review, US Department of Defense (Year: 1990).*
Pigeon et al., Dempster-Shafer theory for multi-satellites remotely-sensed observations, 2000, In Sensor Fusion: Architectures, Algorithms, and Applications IV (Year: 2000).*
English translation of CN-109564099-A (Year: 2019).*
English translation of DE-102019131637-A1 (Year: 2021).*
Sentz, K., Ferson, S., "Combination of Evidence in Dempster-Shafer Theory", Sandia Report (SAND2002-0835), Apr. 2002.

* cited by examiner

METHOD AND SYSTEM OF INCONSISTENT MAP DATA RECONCILIATION IN CONNECTED VEHICLES

INTRODUCTION

The present disclosure relates to data processing in advanced driver assistance system equipped vehicles, more specifically to method and system of inconsistent map data reconciliation in connected vehicles.

Advanced Driver Assistance Systems (ADAS) are intelligent systems that reside onboard a vehicle and are used to enhance or automate functions of various vehicle systems. A typical ADAS includes a control module that is in communication with vehicle sensors such as exterior, interior, and state sensors, as well as with various vehicle systems such as steering, acceleration, braking, and safety systems. The controller analyzes information gathered by the vehicle sensors and generates instructions for operating the vehicle ranging from a partial autonomous mode to a full autonomous mode in accordance with the levels of driving automation as provided in SAE J3016 publication.

The control module is in communication with the exterior sensors to continuously collect information on the external surrounding environment of the vehicle. Exterior sensors that the ADAS equipped vehicles typically rely on are that of cameras, long and short-range sensors such as radars, and Light Detection and Ranging (LIDAR) sensors. Information gathered by the exterior sensors are processed by a detection module to detect objects, identify the detected objects, and determine the locations of the identified objects. Information on the identity of the object and location of object may be uploaded as map data to a cloud-based server and consolidated with other map data collected by other similarly equipped participating vehicles for generating a virtual map. The virtual map may include road information, identified objects, locations of identified objects, and operating conditions of an area beyond the range of the exterior sensors of any one participating vehicle. The map data is retrievable by the participating vehicles for enhanced operation of the ADAS.

On occasions, the map data of a same object, collected either from different exterior sensors on the same vehicle, or from different vehicles, could be inconsistent or even conflicting with each other. As an example, an objected detected by a front mounted camera is identified as a stop sign, while the same object detected by a forward radar sensor on the same vehicle is identified as a moving vehicle. Exterior sensors mounted on other participating vehicles may detect the same object and identify the same object as something other than a stop sign or moving vehicle. This inconsistent identification of the same object by different sensors on the same or different vehicles may be due to sensor operating error, limited effective sensor range, occlusion of the sensor, and other variables.

Thus, while the current method of processing information collected by exterior sensors to detect and identify objects achieves its intended purpose, there is a need for a method and system for reconciling inconsistent map data for ADAS equipped vehicles.

SUMMARY

According to several aspects, a method of reconciliation of map data for connected vehicles is provided. The method includes receiving information gathered by a plurality of sensors distributed among a plurality of vehicles on a predetermined mapping area; processing the information to detect a same object; determining an identification of the same object for each of the plurality of sensors; determining a confidence level of the identification of the same object in the format of a belief value and a plausibility value for each of the plurality of vehicles based on the determined identification of the same object for each of the plurality of sensors; determining a probability mass function (PMF) of the identification of the same object using Dempster-Shafer Theory based on the determined confidence level of the same object for each of the plurality of vehicles; determining a most probable identification of the same object based on the PMF; and communicating the most probable identification of the same object to at least one of the plurality of vehicles to implement a vehicle operation.

In an additional aspect of the present disclosure, determining the confidence level of the same object includes enumerating all mutually exclusive identifications of the same object and allowing uncertainty states. Determining the confidence level of the identification of the same object includes calculating a lower bound belief value and calculating an upper bound plausibility value.

In an additional aspect of the present disclosure, determining the probability mass function (PMF) of the identification of the same object using Dempster-Shafer Theory includes an equal context relevance weight for each of the plurality of sensors and an equal input weight for each of the plurality of vehicles.

In an additional aspect of the present disclosure, the method further includes determining a context relevance weight to each of the plurality of sensors; determining a historical credit score to each of the plurality of vehicles; and determining a weight function as a joint function of the context relevance weight and the historical score.

In an additional aspect of the present disclosure, the method further includes eliminating identifications of the same object with null probability; and redistributing the PMF among viable identifications of same object.

In an additional aspect of the present disclosure, determining the confidence level of the identification of the same object is performed by a module located on a respective vehicle. The determined confidence level is uploaded to a server located off-board the respective vehicle. The probability mass function (PMF) of the identification of the same object using Dempster-Shafer Theory is performed by a cloud server.

In an additional aspect of the present disclosure, determining the historical credit score to each of the plurality of vehicles is based on an individual vehicle's historical reporting alignment with other vehicles.

According to several aspects, a method of map data reconciliation includes gathering information from a plurality of sensors for a predetermined map area; processing the information to detect a same object in the predetermined map area, determine all possible identifications of the same object, and determine a sensing confidence level of the determined possible identifications of the same object; determining a reconciled identification of the same object based on the determined sensing confidence level using a predetermined algorithm based on Dempster-Shafer theory; and communicating the reconciled identification of the same object to at least one vehicle to implement a vehicle operation.

In an additional aspect of the present disclosure, determining the sensing confidence level includes:

calculating a Belief of the identification of the same object, using:

$$\text{Belief}_i(R) = \sum_{E_k \subseteq R} p_i(E_k)$$

and calculating a Plausibility of the identification of the same object, using:

$$\text{Plausibility}_i(R) = 1 - \sum_{E_k \cap R = \phi} p_i(E_k)$$

wherein:
  i is identification of same object;
  R is the observed event;
  $E_k$ is the evidence for the observed event; and
  $p_i(E_k)$ is the observation made by an individual vehicle.

In an additional aspect of the present disclosure, the plurality of sensors is distributed amongst a plurality of vehicles within the predetermined area. The method further includes determining a scene context weight function for at least one of the plurality of sensors; determining a historical credit score for each of the plurality of vehicles; and determining a weight function $W_i(R)$:

$$W_i(R) = h(f_i(R), g_i(R))$$

where: $f_i(R)$ is the scene context weight function of the respective sensor; and $g_i(R)$ is the historical credit score of the respective vehicle.

In an additional aspect of the present disclosure, the method further includes calculating a new probability mass function (PMF), using the equation:

$$\text{New } PMF_{(i,j)}(R) = \frac{\text{Belief}_{(i,j)}(R)}{\text{Plausibility}_{(i,j)}(R)} = \frac{\sum_{E_k \cap E_N = R} p_i(E_k) p_j(E_N)}{1 - \sum_{E_k \cap E_N = \phi} p(E_k) p_j(E_N)}$$

wherein:
  $E_k$ and $E_N$ are the evidence for the different observed events, $p_i(E_k)$ and $p_j(E_N)$ are the observation made by vehicle i and vehicle j respectively,
  New $PMF_{(i,j)}(R)$ is the newly generated PMF function for the event that is the union of all original observed events $E_k$ and $E_N$ by vehicle i and vehicle j,
  $\Sigma_{E_K \cap E_N = R} p_i(E_k) p_j(E_N)$ represents mutually supporting evidence (i.e., the belief value), and
  $1 - \Sigma_{E_K \cap E_N = \phi} p(E_k) p_j(E_N)$ represents the probability of evidence not against the observed events (i.e., the plausibility).

According to several aspects, a system for reconciliation of map information. The system includes at least one vehicle having at least one exterior sensor configured to gather information on an area surrounding the vehicle, a vehicle module configured to process the gathered information to detect a same object, identify the same object, and to determine a confidence level of the identity of the same object, and a communication system for transmitting the confidence level of the identity of the detected object; and a conflict resolution module configured to receive a plurality of confidence levels of identifications of the same detected object from a plurality of vehicles and determine a reconciled identification of the same object using an algorithm based on Dempster-Shafer Theory.

In an additional aspect of the present disclosure, the vehicle module is further configured to assign a scene context weight function to the at least one exterior sensor.

In an additional aspect of the present disclosure, the system further includes a weight context module configured to apply a weight function based on the scene context weight function assigned to the exterior sensor and/or a on a historical score of the at least one vehicle.

In an additional aspect of the present disclosure, the conflict resolution module is a cloud-based server.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale and some features may be exaggerated or minimized to show details of particular features. The specific structural and functional details disclosed are not intended to be interpreted as limiting, but as a representative basis for teaching one skilled in the art as to how to practice the disclosed concepts.

As used herein, the term module refers to any hardware, software, firmware, electronic control component, programmable controller, processing logic, and/or processor device, individually or in any combination, including without limitation: application specific integrated circuit (ASIC), an electronic circuit, a processor (shared, dedicated, or group)

and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
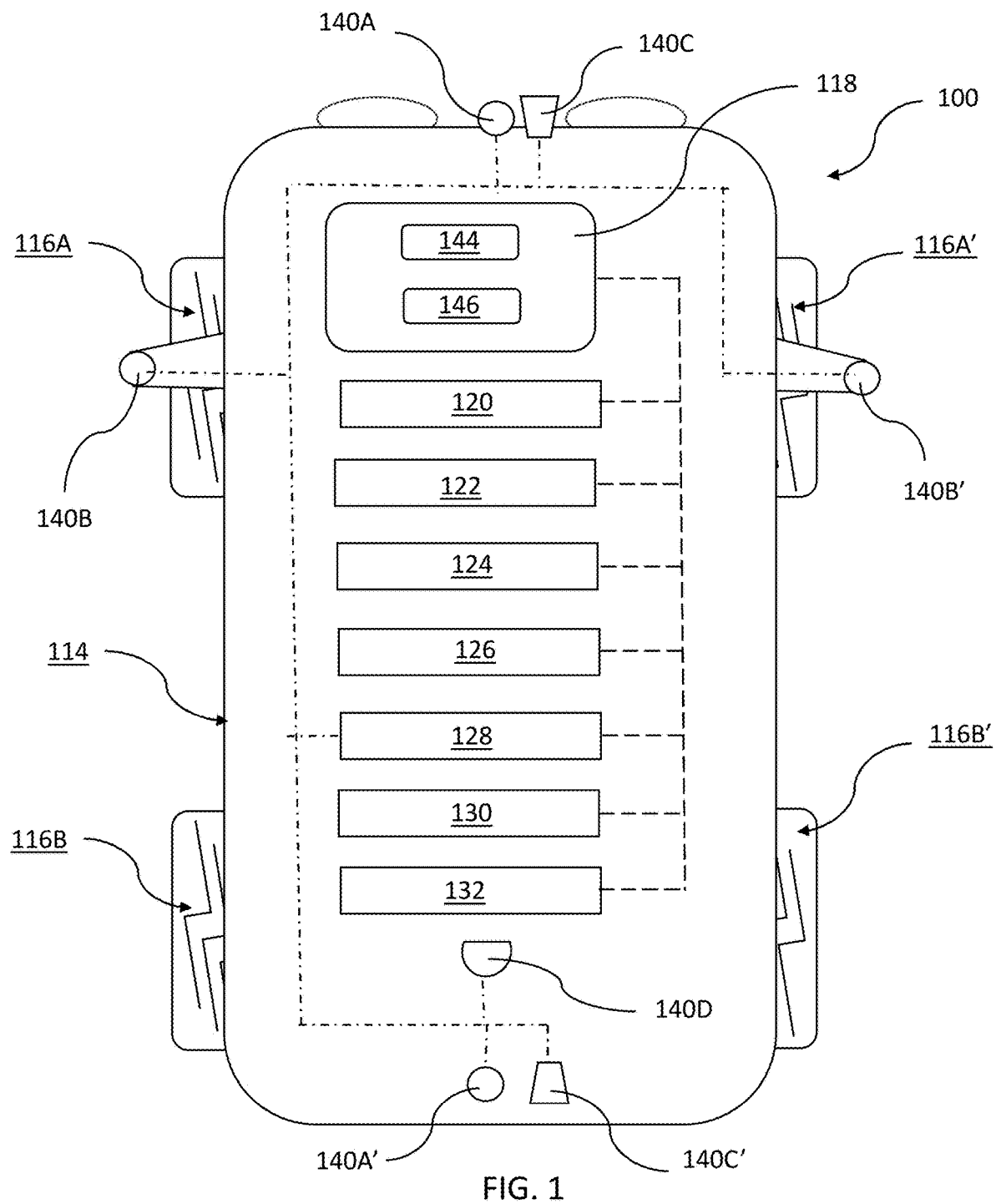
FIG. 1 is a functional block diagram representation of a vehicle equipped with an advanced driver assistance system (ADAS), according to an exemplary embodiment.

Referring to FIG. 1, a functional block diagram representation of a vehicle 100 equipped with an advanced driver assistance system (ADAS), also referred to as the ADAS vehicle 100. The ADAS is configured to provide a level of driving automation from partial autonomous mode to full autonomous mode in accordance with SAE J3016 Levels of Driving Automation. The vehicle 100 generally includes a body 114, front wheels 116A, 116A' and rear wheels 116B, 116B'. The front wheels 116A, 116A' and the rear wheels 116B, 116B' are each rotationally located near a respective corner of the body 114. While the vehicle 100 is depicted as a passenger car, other examples of ADAS equipped vehicles include, but are not limited to, land vehicles such as motorcycles, trucks, sport utility vehicles (SUVs), and recreational vehicles (RVs), and non-land vehicles including marine vessels and aircrafts.

As shown, the vehicle 100 generally includes at least one vehicle control module 118, also referred to as controller 118, a propulsion system 120, a transmission system 122, a steering system 124, a brake system 126, a detection system 128, an actuator system 130, and a vehicle communication system 132.

The propulsion system 120 may, in various embodiments, include an internal combustion engine, an electric machine such as a traction motor, and/or a fuel cell propulsion system. The transmission system 122 is configured to transmit power from the propulsion system 120 to the front wheels 116A, 116A' and/or the rear wheels 116B, 116B' according to selectable speed ratios. According to various embodiments, the transmission system 122 may include a step-ratio automatic transmission, a continuously variable transmission, or other appropriate transmission. The brake system 126 is configured to provide braking torque to the front wheels 116A and the rear wheels 116B. The brake system 126 may, in various embodiments, include friction brakes, brake by wire, a regenerative braking system such as an electric machine, and/or other appropriate braking systems. The steering system 124 influences a position of the front wheels 116A and/or the rear wheels 116B. The actuator system 130 includes one or more actuator devices that control components of the propulsion system 120, the transmission system 122, the steering system 124, and the brake system 126.

The detection system 128 includes one or more vehicle sensing devices, also referred to as exterior sensors 140A-140D, that collect information on observable conditions of the exterior environment surrounding the vehicle 100. Examples of vehicle sensing devices 140A-140D include, but are not limited to, radars, lidars, optical cameras, thermal cameras, ultrasonic sensors, and/or other sensors. In the non-limiting example shown in FIG. 1, the vehicle 100 includes a front camera 140A having a forward field of view, a rear camera having a rearward field of view 140A', two side mounted cameras 140B, 140B', a forward-facing radar 140C, a rearward facing radar 140C', and a lidar 140D. Information collected by the exterior sensors 140A-140D are processed by the controller, a detection module, and/or micro-processors on the sensors.

The vehicle communication system 132 is configured to wirelessly communicate information to and from other entities ("vehicle-to-everything (V2X)" communication). Vehicles equipped with a vehicle communications system 132 are also referred to as connected vehicles. For example, the vehicle communication system 132 is configured to wirelessly communicate information to and from other vehicles ("vehicle-to-vehicle (V2V)" communication), to and from driving system infrastructure ("vehicle to infrastructure (V2I)" communication), remote systems, and/or personal devices. In an embodiment, the vehicle communication system 132 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels designed for automotive use and a corresponding set of protocols and standards. The vehicle communication system 132 may also include a Global Positioning System (GPS) receiver for receiving GPS signals from satellites for determining the vehicle's position.

The controller 118 includes at least one processor 144 and at least one data storage device 146. The data storage device 146 is a computer readable storage device 146 and may also be referred to a computer readable media 146 and a computer readable medium 146. In an embodiment, the computer readable storage device 146 includes executable instructions for an embodiment of a method of reconciling inconsistent map data, which is described in detail below. It should be appreciated that the data storage device 146 may be part of the controller 118, separate from the controller 118, or part of the controller 118 and part of a separate system.

The processor 144 can be any custom made or commercially available processor, a central processing unit (CPU), a graphics processing unit (GPU), an auxiliary processor among several processors associated with the controller 118, a semiconductor-based microprocessor (in the form of a microchip or chip set), a macro-processor, any combination thereof, or generally any device for executing instructions.

The computer readable storage device 146 may include volatile and nonvolatile storage in a non-transitory memory unit, read-only memory (ROM), random-access memory (RAM), and keep-alive memory (KAM), for example. KAM is a persistent or non-volatile memory that may be used to store various operating variables while the processor 144 is powered down. The computer-readable storage device 146 may be implemented using any of a number of known memory devices such as PROMs (programmable read-only memory), EPROMS (electrically PROM), EEPROMs (electrically erasable PROM), flash memory, or any other electric, magnetic, optical, or combination memory devices capable of storing data, some of which represent executable instructions, used by the controller 118 in controlling the vehicle 100 and executing the method of reconciling inconsistent map data.

The instructions may include one or more separate programs, each of which comprises an ordered listing of executable instructions for implementing logical functions. The instructions, when executed by the processor 144, receive and process signals from the detection system 128, perform logic, calculations, methods and/or algorithms for automatically controlling the components of the vehicle 100, and generate control signals to the actuator system 130 to automatically control one or more systems of the vehicle 100 based on the logic, calculations, methods, and/or algorithms. Although only one controller 118 is shown in FIG. 1, alternative embodiments of the vehicle 100 can include any number of controllers 118 that communicate over any suitable communication medium or a combination of communication mediums and that cooperate to process the sensor signals, perform logic, calculations, methods, and/or algorithms, and generate control signals to automatically control features of the vehicle 100.

Figure 2:
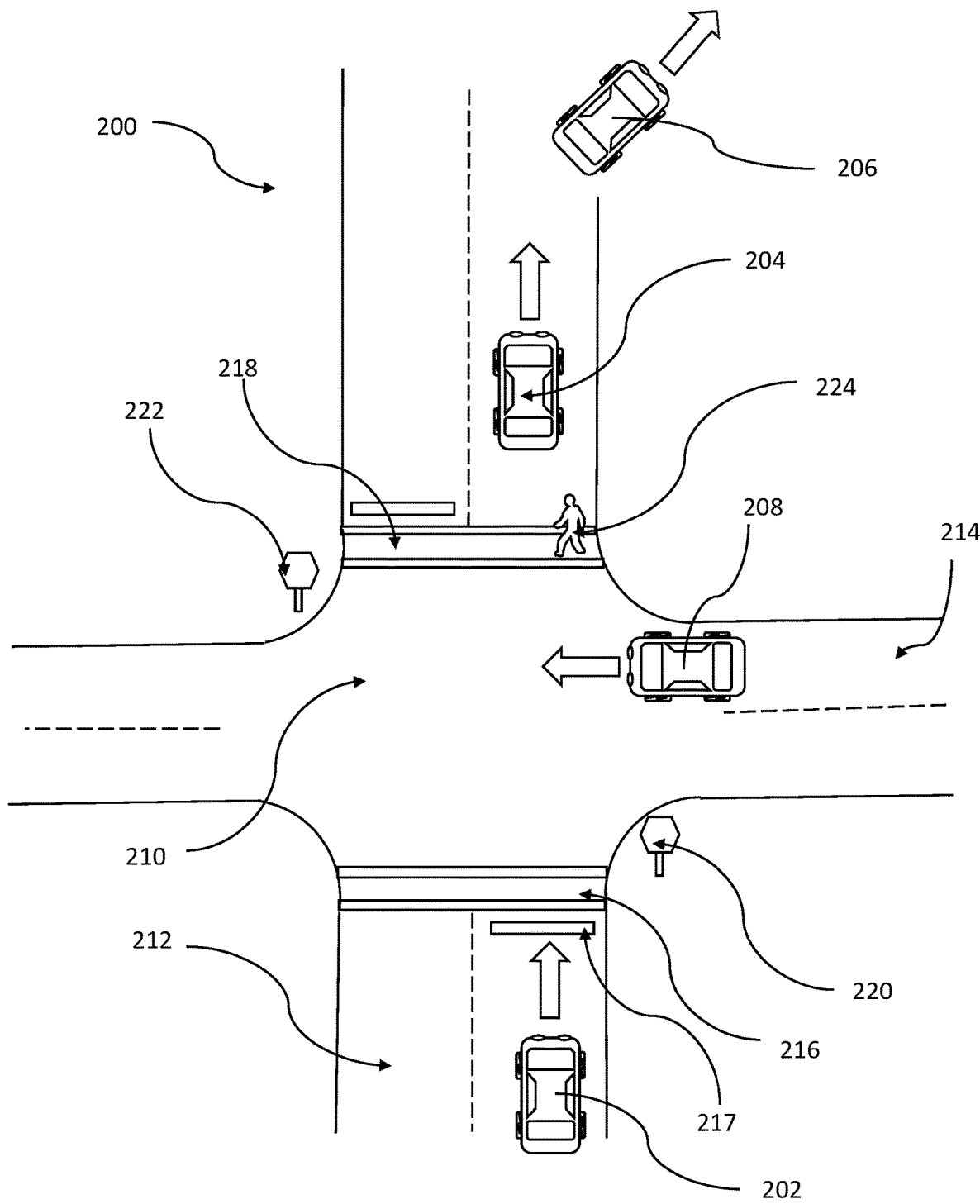
FIG. 2 is an illustration of a scenario with multiple ADAS equipped vehicles operating in the vicinity of a four-way intersection, according to an exemplary embodiment.

FIG. 2 is an illustration of a scenario 200 with four ADAS equipped vehicles 202, 204, 206, 208 operating in the vicinity of a four-way intersection 210. The scenario 200 shows a map area having a first two-lane roadway 212 intersecting a second two-lane roadway 214 at the intersection 210, a first pedestrian crossing 216, a second pedestrian crossing 218, a first stop sign 220, a second stop sign 222, and a pedestrian 224 walking across the second pedestrian crossing 218. The first vehicle 202 is shown traveling on the first roadway 212 toward the intersection 210 before reaching the first pedestrian crossing 216. The second vehicle 204 is shown traveling on the first roadway 212 passed the intersection 210 and the second pedestrian crossing 218. The third 206 is shown traveling on the first roadway 212 ahead of the second vehicle 204 and moving off the map area. The fourth vehicle 208 is shown on the second roadway 214 entering the intersection 210.

Each of the vehicles 202, 204, 206, 208 includes a detection system 128 having a plurality of exterior sensors including front, rear, and side cameras; forward and rearward facing radars; lidar; and some other type of object detection technology including short range communications technologies such as Dedicated Short-Range Communications [DSRC] or Ultra-Wide Band [UWB]. The exterior sensors collect information on the exterior environment surrounding the respective vehicles 202, 204, 206, 208. The information collected by the sensors are processed to detect objects, identify the detected objects, and determine the location of the identified objects in the vicinity of each respective vehicle. The objects may include other vehicles, curbs, roadway markings and boundaries, pedestrians, signs, and any sort of objects that may be on or near the roadway. The detected objects, identity of the objects, and location of the objects observed by each of the vehicles 202, 204, 206, 208 may be uploaded to a central server or decentralized cloud-server as map data. The central and/or cloud server-can further process the map data and communicate the map data to other participating vehicles that are approaching the intersection 210. The participating vehicles may use the map data to enhance a vehicle operation such as automated driving.

Map data on the same object collected by various exterior sensors on the same vehicle or on different vehicles could be inconsistent or even conflicting with each other. This inconsistency or conflict may be due to the individual exterior sensor's error, limited sensor range, and scene occlusion. For example, information on the first stop sign 220, first pedestrian crossing 216, and pedestrian 224 are collected by the plurality of sensors on the first vehicle 202. However, the processing of the information collected by each sensor may correctly detect the objects of the first stop sign 220, first pedestrian crossing 216, and pedestrian 224, but incorrectly identify or fail to detect the second pedestrian crossing 218 at all. This may be due to sensor error, limited sensor range, and/or scene occlusion.

As an example of scene occlusion, the fourth vehicle 208 entering the intersection is partially blocking the second pedestrian crossing 218 and pedestrian 224. Therefore, the sensors of the first vehicle 202 may have detected the second pedestrian crossing 218 and pedestrian 224 as objects, but incorrectly identified or misclassified the objects as a pedestrian crossing and a pedestrian, respectively. Sensors on the same vehicle providing inconsistent or incomplete map data on the same object is referred to as intra-vehicle map object inconsistency.

Furthermore, due to different locations of the vehicles' 202, 204, 206, 208 with respect to the intersection 210 and the limitations of the sensors detecting a same object proximal to the intersection 210, the same object might be identified differently. For example, the front camera of the first vehicle 202 may detect and identify the first stop sign 220 correctly, however, the forward radar of the fourth vehicle 208 might identify the first stop sign 220 as a moving vehicle, as the fourth vehicle 208 travels through the intersection. Furthermore, information collected by the third vehicle 206 may be stale due to the time lapse at the time of detection and time of uploading to the central and/or cloud base server. In which case, the third vehicle 206 may have correctly detected the second pedestrian crossing 218 and first stop sign 220, but not the pedestrian 224 walking across the first roadway 212. Sensors on the different vehicles providing inconsistent map data on the same object is referred to as inter-vehicle map object inconsistency.

A method is provided to reconcile inconsistent map data by using Dempster-Shafer theory (DS Theory) to harmonize conflicting evidence towards the same object or scene, through a generalized Bayesian analysis mechanism, to allow 'gray zone' rather than 'white-vs-black' operations. The method is a two-tier data architecture to collect, treat, and corroborate inconsistent data sources for intra-vehicle (same vehicle) and inter-vehicle (amongst two or more different vehicles) data collection systems. DS Theory is disclosed in a publication "Combination of Evidence in Dempster-Shafer Theory" by Sandia National Laboratories and is hereby incorporated by reference in its entirety. Sentz, K., Ferson, S., "Combination of Evidence in Dempster-Shafer Theory", Sandia Report (SAND2002-0835), April 2002.

The DS Theory is adopted and customized for the automotive data domain by using unique characteristics of automotive data that includes data redundancy and sequential continuity. The vehicle context is unique in that the data collection is facilitated through a full array of sensors, each of which collects data continuously. As such, different sensors can provide redundant information, though a means of confirmation, as well as detect the same object multiple times in time series across those sensors, though the perspective may vary as the vehicle, and potentially the object, moves. As such, this should be handled along with potential inconsistencies across sensors or across time. In addition, context relevance could be effectively used as a pre-filter to filter out the detected objects with low relevance such as bad viewing angle, undesirable environments causing ambiguity like foggy environment, sun glare, and the likes.

A weighted discrimination mechanism is applied towards information source from different vehicles based on historical track-of-record 'credit score' and real-time observation context of the sensors. The weighted discrimination mechanism takes into account that a particular vehicle may be considered more reliable based on confirmed accuracy or consistency in prior collected data from that source, reflected by a higher "credit score", which will make it more trusted in the context of reconciliation with other vehicles. Further, the freshness of collected data (real-time context) and consistency across a single vehicle's sensors can contribute to a higher trust, more accurate and/or more consistent, in the information collected.

Figure 3:
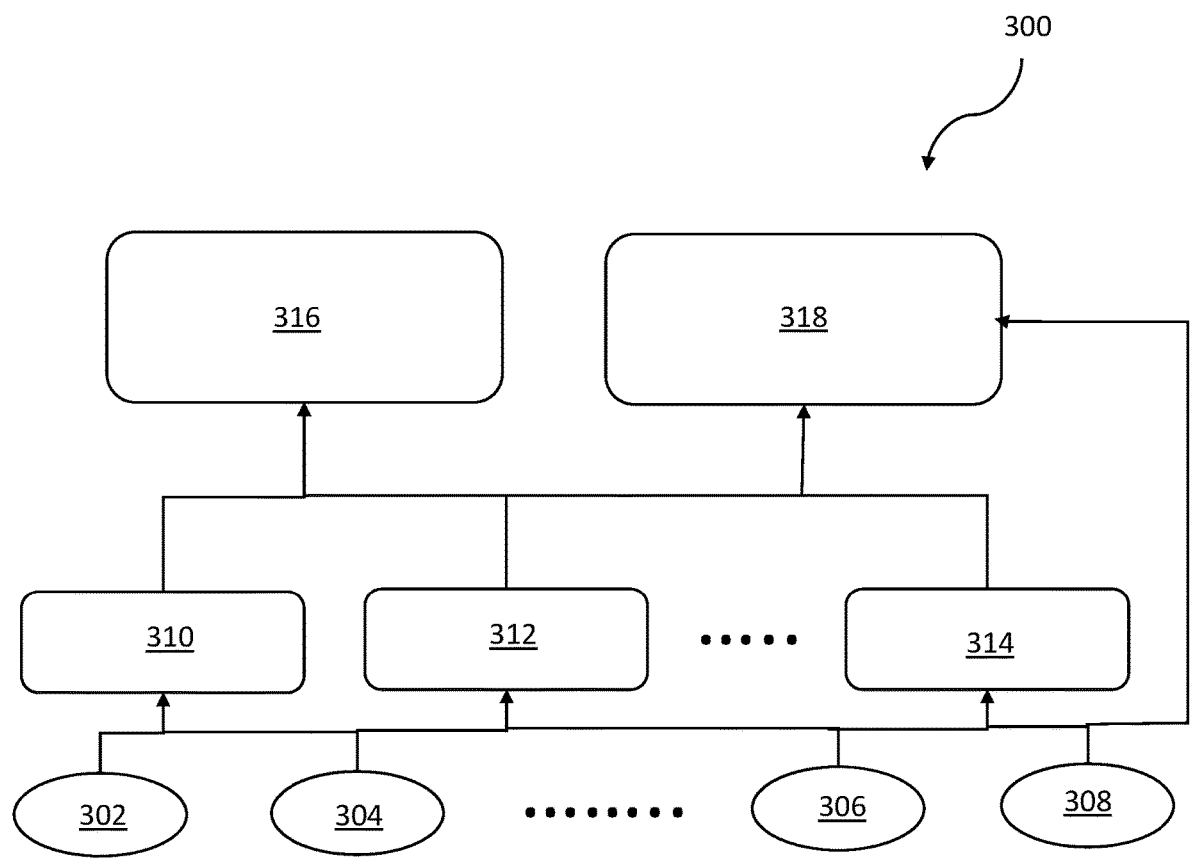
FIG. 3 is a functional block diagram of a system 300 for reconciling intra-vehicle map object inconsistency, according to an exemplary embodiment.

FIG. 3 is a functional block diagram of a system 300 for reconciling intra-vehicle map object inconsistency. The system 300 includes a N number of exterior sensors included a first sensor 302, a second sensor 304, a N−1 sensor 306, and a N-sensor 308, where N is the total number of external sensors on the vehicle. The sensors 302-308 are configured to gather information on an area within sensor range surrounding the vehicle. Information gathered from the sensors 302-308 are fed to one or more detection modules 310, 312, 314 for processing to detect objects, identify the detected objects, and determine the locations of the identified objects. It is understood that the detection modules 310, 312, 314 include at least a processor and a memory module, where the processors are configured with execute instruction stored in the memory module to process the information gathered by the exterior sensors. It is further understood that individual sensors may include sensor dedicated microprocessors that function as detection modules.

Map data generated for the identified objects from the detection modules are fed to an onboard module 316 to determine the sensing confidence level of the map data or a component of the map data such as the identity of the detected object. The confidence level includes a Belief or belief value, also known as a lower bound, and a Plausibility or plausibility value, also known as an upper bound. The lower bound represents all evidence supporting a hypothesis/observation, for example, that the detected object is a stop sign. The upper bound represents all evidence not against the hypothesis/observation.

Concurrently, map data generated by the modules 310-314 are communicated to a vehicle context module 318. The vehicle context module 318 processes the map data to determine vehicle scene context with respect to time of observation, location, environmental factors, and other relevant factors such as sensor type, sensor position, scene occlusion, etc. for each sensor during the period that the sensor information was collected.

Figure 4:
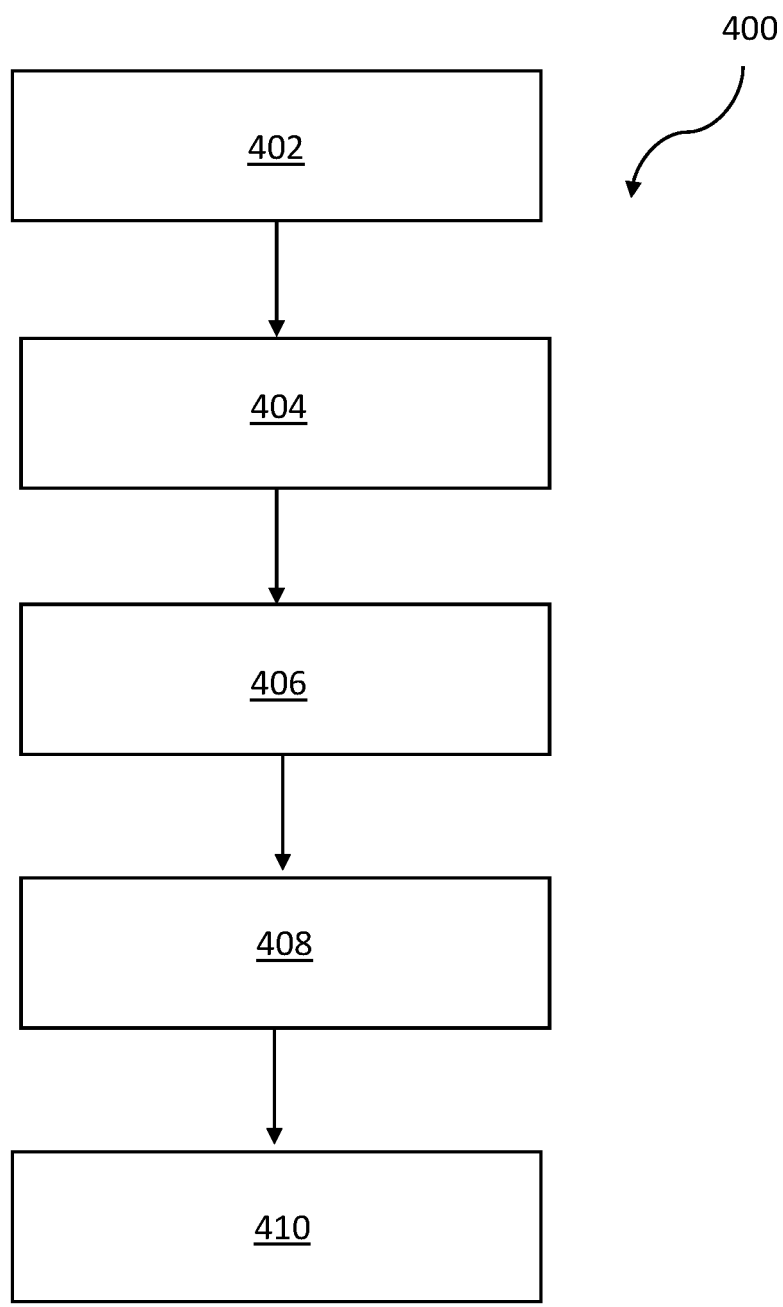
FIG. 4 is a flow block diagram of steps for reconciliation of intra-vehicle map object data inconsistencies, according to an exemplary embodiment.

FIG. 4 is a flow block diagram 400 of steps for reconciliation of intra-vehicle map object data inconsistencies. In Block 402, enumerate all mutually exclusive possibilities of event i in a predetermined map area surrounding one or more of the vehicles. The predetermined map area is also referred to as a design space w. For example, a design space can be defined as the area immediately in front of the first vehicle where the focus is the one stop bar 217 in front of the first vehicle 202, and possible color of the stop bar is white (W) or yellow (Y). $\psi=\{Y, W, \{Y \text{ or } W\}, \{\overline{Y}\&\overline{W}\}\}$, by allowing 2 extra uncertainty states.

Moving to Block 404, calculate event i's belief value (Lower Bound), which is all evidence supporting the observed event R.

$$\text{Belief}_i(R) = \sum_{E_k \subseteq R} = p_i(E_k)$$

wherein: i is identification of same object;
R is the observed event; and
$E_k$ is the evidence for the observed event.

Moving to Block 406, calculate event i's plausibility value (Upper Bound), which is all evidence not against this observation of event R.

$$\text{Plausibility}_i(R) = 1 - \sum_{E_k \cap R = \phi} p_i(E_k)$$

Moving to Block 408, repeat Block 404 and Block 406 until all event i is studied.

Moving to Block 410, determine the context information, such as time, location, environmental factors such as weather, ambient light, road condition etc., and other relevant factors such as the heading of the vehicle, the range of the sensors, field of view, etc. for each sensor.

Figure 5:
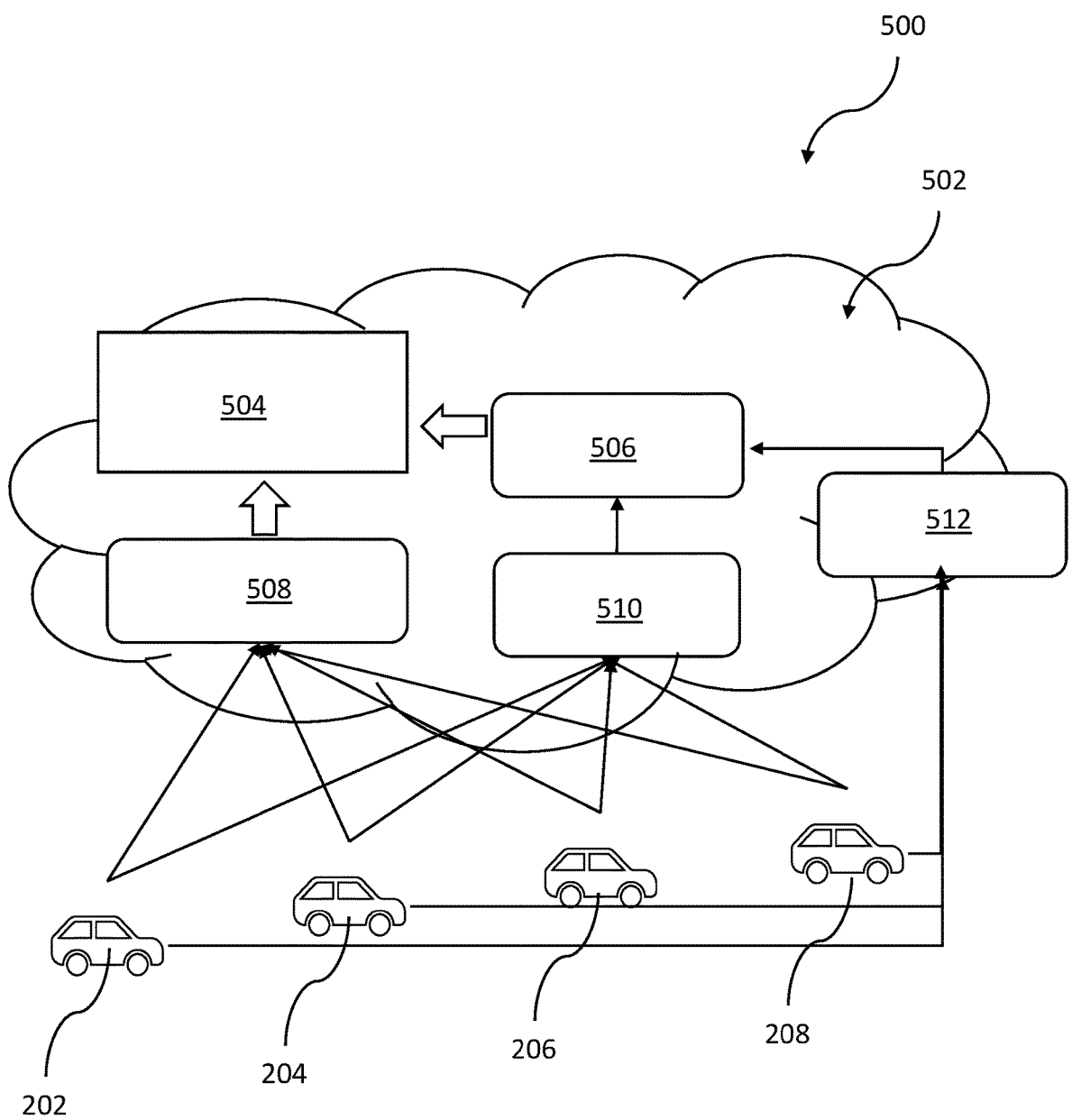
FIG. 5 is a functional block diagram of a system for reconciling inter-vehicle map object inconsistency, according to an exemplary embodiment.

FIG. 5 is a functional block diagram 500 of a system for reconciling inter-vehicle map object inconsistency with map data collected from a plurality of vehicles. The system includes a decentralized cloud server 502 having a conflict resolution module 504 and a weight calculation module 506. The conflict resolution module 504 may be a centralized server 502 or a de-centralized cloud-based server 502. At Block 508, the sensing confidence levels calculated for event (i) by each exterior sensors on a participating vehicle are uploaded to the cloud-based conflict resolution module 504. At Block 510, the contextual weight functions of each exterior sensor for observing event (i) on the participating vehicle are uploaded to the weight calculation module 506. At Block 512, a historical "credit score" assigned to the participating vehicle is communicated to the weight calculation module 506. This is repeated for each participating vehicle.

Figure 6:
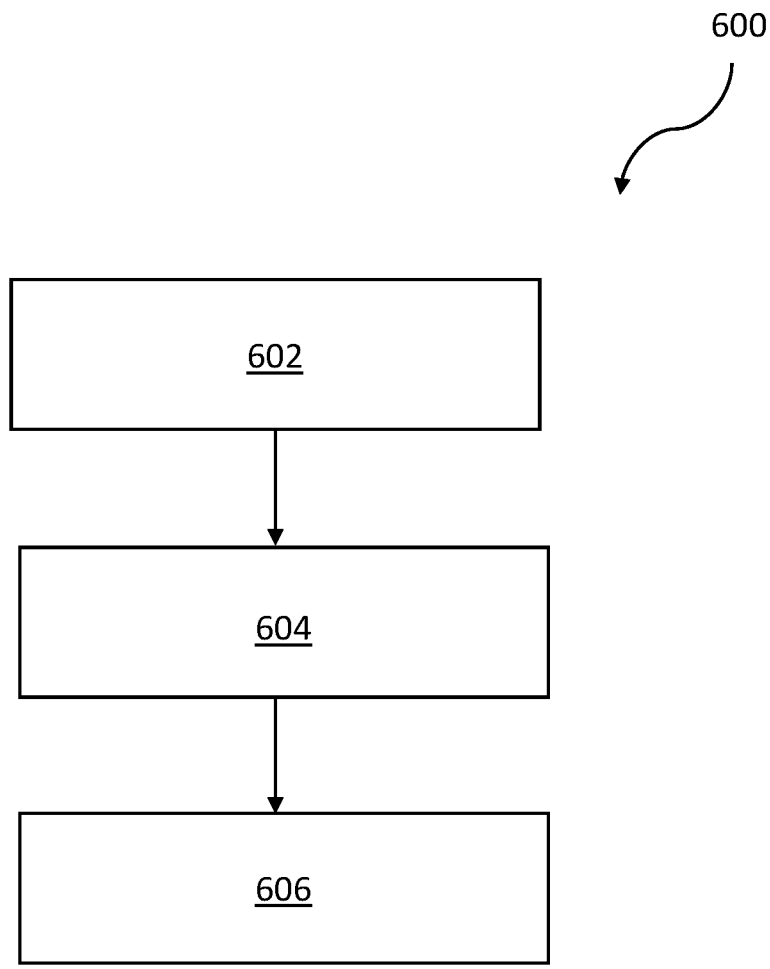
FIG. 6 is a flow block diagram of steps for inconsistent data reconciliation through equal contribution, according to an exemplary embodiment.

The weight function of an individual vehicle is determined by its own historical 'credit score' and context relevance factor of its sensors. The credit score is determined by examining the difference of final global consensus and individual contributed opinion. In a non-limiting example, for a given vehicle, if participating vehicle's individually contributed opinion is always aligned with the final global consensus, the participating vehicle is assigned a higher credit score, otherwise, the participating vehicle is assigned a lower score. Contextual relevance is to determine if the context/scenarios in which sensor input was generated is indeed relevant to the targeted scenarios FIG. 6 is a flow block diagram 600 of steps for inconsistent data reconciliation through equal contribution, according to one embodiment. For the same scene/object, there could be multiple vehicles observing it from different angles or different ranges. The challenge is how to reconcile the inconsistent, or even conflicting, observations from these vehicles. Input of observations from each vehicle is treated equally when being plugged into cloud-based conflict resolution module 504, in order to develop equal-weight consensus.

In Block 602, upload the Belief and Plausibility [Belief, Plausibility] to the cloud-based conflict resolution module 504 from each participating vehicle, also referred to as a reporting vehicle. The cases with similar observations from different vehicles got reinforced ("higher chance"), while the cases with contradictory observations will be lessened ("lower chance").

Moving to Block 604, the cloud-based conflict resolution module 504 is configured to calculate the New Probability Mass Function (PMF) of the combined sensor inputs using D-S Theory.

$$\text{New } PMF_{(i,j)}(R) = \frac{\text{Belief}_{(i,j)}(R)}{\text{Plausibility}_{(i,j)}(R)} = \frac{\sum_{E_k \cap E_N = R} p_i(E_k) p_j(E_N)}{1 - \sum_{E_k \cap E_N = \phi} p(E_k) p_j(E_N)}$$

wherein:
$E_k$ and $E_N$ are the evidence for the different observed events, $p_i(E_k)$ and $p_j(E_N)$ are the observation made by vehicle i and vehicle j respectively, New $PMF_{(i,j)}(R)$ is the newly generated PMF function for the event that is the union of all original observed events $E_k$ and $E_N$ by vehicle i and vehicle j, $\Sigma_{E_k \cap E_N = R} p_i(E_k) p_j(E_N)$ represents mutually supporting evidence (i.e., the belief value), and $1-\Sigma_{E_k \cap E_N = \phi} p(E_k) p_j(E_N)$ represents the probability of evidence not against the observed events (i.e., the plausibility).

Moving to Block 606, the cloud-based conflict resolution module 504 is further configured to eliminate scenarios with null probability and redistribute PMF among viable scenarios. Some possibilities/states will become impossible due to different conflicting observations, and thus should be eliminated.

Figure 7:
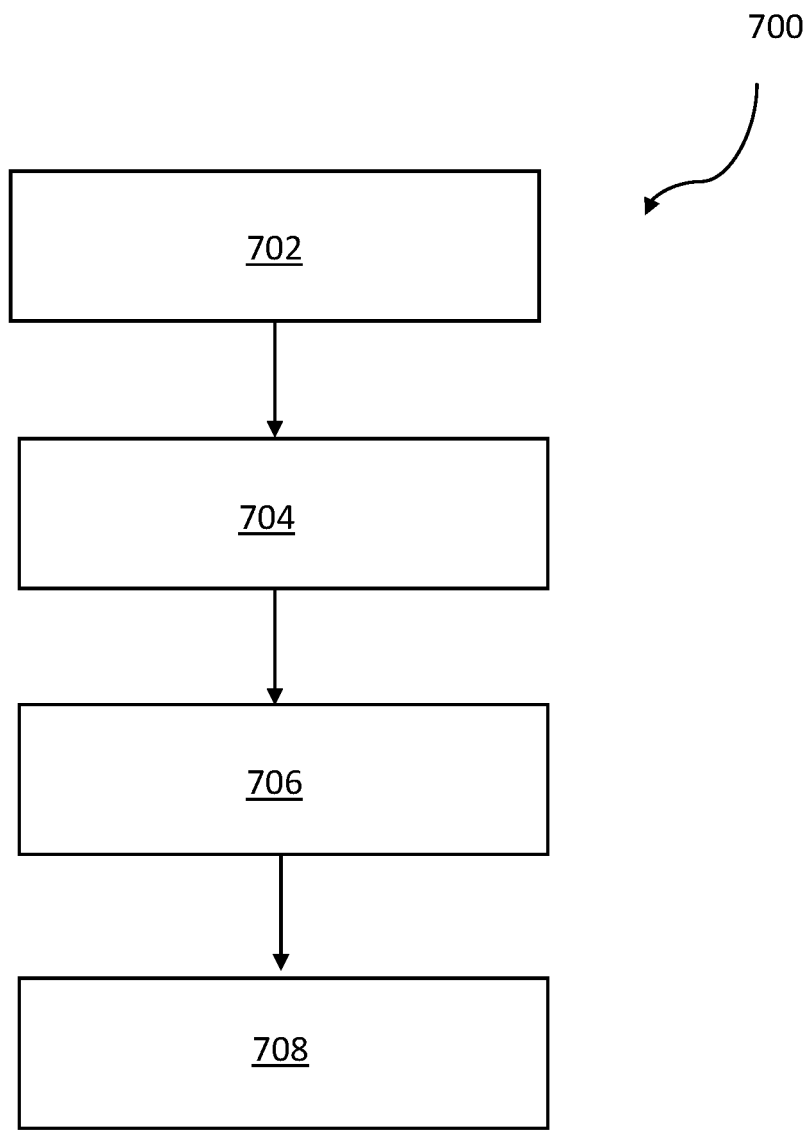
FIG. 7 is a flow block diagram of steps for in consistent data reconciliation through biased contribution, according to another embodiment, according to an exemplary embodiment.

FIG. 7 is a flow block diagram 700 of steps for in consistent data reconciliation through biased contribution, according to another embodiment. In this embodiment, input from each vehicle is treated on unequal-weight consensus (as opposed to an equal-weight bases), based on (1) a particular observation's relevance of its sensors and (2) a particular observer's track-of-record "credit score".

In Block 702, upload the determined [Belief, Plausibility] to the cloud-based conflict resolution module 504 from each reporting vehicle.

Moving to Block 704, the weight calculation module 506 is configured to calculate the vehicle's weight function based on context relevance and credit score. The weight function is represented by the equation:

$$W_i(R) = h(f_i(R), g_i(R))$$

where: $f_i(R)$ is the context relevance weight; and
$g_i(R)$ is the historical credit score of vehicle i.

Moving to Block 706, cloud-based conflict resolution module 504 is configured to calculate the PMF of the combined sensor inputs using D-S theory with the equation:

$$\text{New } PMF_{(i,j)}(R) = \frac{\text{Belief}_{(i,j)}(R)}{\text{Plausibility}_{(i,j)}(R)} = \frac{\sum_{E_k \cap E_N = R} W_{ij} p_i(E_k) p_j(E_N)}{1 - \sum_{E_k \cap E_N = \phi} W_{ij} p_i(E_k) p_j(E_N)}$$

wherein:
$E_k$ and $E_N$ are the evidence for the different observed events, $p_i(E_k)$ and $p_j(E_N)$ are the observation made by vehicle i and vehicle j respectively, New $PMF_{(i,j)}(R)$ is the newly generated PMF function for the event that is the union of all original observed events $E_k$ and $E_N$ by vehicle i and vehicle j, $W_{ij}$ is the weighted factor to jointly reflect the weight of opinions by vehicle i and vehicle j. The weight of opinion by a single vehicle is determined by its own historical 'credit score' and context relevance factor, $\Sigma_{E_k \cap E_N = R} W_{ij} p_i(E_k) p_j(E_N)$ represents mutually supporting evidence (i.e., the belief value), and $1-\Sigma_{E_k \cap E_N = \phi} W_{ij} p_i(E_k) p_j(E_N)$ represents the probability of evidence not against the observed events (i.e., the plausibility).

Moving to Block 708, cloud-based conflict resolution module 504 is further configured to eliminate scenarios with null probability and redistribute PMF among viable scenarios. Some possibilities/states will become impossible due to different conflicting observations, and thus should be eliminated.

The reconciled identification of the same object may be determined by the most probable identification of the same object based on the PMF. The most probable identification of the same object is communicated to at least one of the plurality of vehicles to implement a vehicle operation such as assisted driving from partial autonomous mode to full autonomous mode.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

The invention claimed is:

1. A method of reconciliation of map data for connected vehicles, comprising:
receiving information, gathered by a plurality of sensors distributed among a plurality of vehicles, on a predetermined mapping area;
processing the information to detect a same object observed by the plurality of sensors and determine a scene context for each of the plurality of sensors,
wherein the scene context comprises at least one of a time of observation, a location, a sensor type, a sensor position, and a scene occlusion during the period that the information was collected;
determining an identification of the same object for each of the plurality of sensors;
determining a confidence level of the identification of the same object in a format of a belief value and a plausibility value for each of the plurality of vehicles based on the determined identification of the same object for each of the plurality of sensors on the respective vehicles;
consolidating the confidence levels of the identification of the same object and the scene context;
determining a probability mass function (PMF) of the identification of the same object using Dempster-Shafer Theory based on the consolidated confidence levels, wherein the PMF is weighted based on the scene context of each of the plurality of sensors;

determining a most probable identification of the same object based on the PMF;

reconciling a map data based on the most probable identification of the same object;

communicating the reconciled map data to at least one of the plurality of vehicles, and controlling a vehicle operation based on the reconciled map data by the at least one of the plurality of vehicles.

2. The method of claim 1, wherein determining the confidence level of the identification of the same object, comprises:

enumerating all mutually exclusive identifications of the same object; and allowing uncertainty states.

3. The method of claim 2, wherein determining the confidence level of the identification of the same object, comprises calculating the belief value and calculating the plausibility value based on all mutually exclusive identifications of the same object and uncertainty states.

4. The method of claim 3, wherein determining the probability mass function (PMF) of the identification of the same object using Dempster-Shafer Theory, includes an equal scene context weight for each of the plurality of sensors.

5. The method of claim 3, further comprising:

determining a scene context weight for each of the plurality of sensors; determining a historical credit score for each of the plurality of vehicles; and determining a weight function as a joint function of the scene context weight and the historical credit score; and determining the probability mass function (PMF) of the identification of the same object using Dempster-Shafer Theory includes taking the weight function into consideration.

6. The method of claim 3, wherein determining the probability mass function (PMF) of the identification of the same object using Dempster-Shafer Theory includes utilizing the equation:

$$PMF_{(i,j)}(R) = \frac{\text{Belief}_{(i,j)}(R)}{\text{Plausibility}_{(i,j)}(R)}$$

wherein:

$PMF_{(i,j)}(R)$ is the generated PMF function for the event that is the union of all original observed events by a vehicle i and a vehicle j.

7. The method of claim 6, further comprises:

eliminating identifications of the same object with null probability; and redistributing the PMF among viable identifications of the same object.

8. The method of claim 1, wherein:

determining the confidence level of the identification of the same object is performed by a module located on one of the plurality of vehicles; and the determined confidence level is uploaded to a server located off-board the respective vehicle.

9. The method of claim 1, wherein:

determining the probability mass function (PMF) of the identification of the same object using Dempster-Shafer Theory is performed by a cloud server.

10. The method of claim 5, wherein determining the historical credit score to each of the plurality of vehicles is based on an individual vehicle's historical reporting alignment with other vehicles.

11. A method of map data reconciliation, comprising:

gathering information, from a plurality of sensors, for a predetermined map area;

processing the information to:

detect a same object in the predetermined map area, determine all possible identifications of the same object, determine a scene context for each of the plurality of sensors, and determine a sensing confidence level of the determined possible identifications of the same object;

determining a reconciled identification of the same object based on the determined sensing confidence level using a predetermined algorithm based on Dempster-Shafer theory, wherein the predetermined algorithm includes a weight based on the scene context for each of the plurality of sensors; and communicating the reconciled identification of the same object to at least one vehicle; and controlling a vehicle operation based on the identification of the same object;

wherein the scene context comprises at least one of a time of observation, a location, an environmental factor, a sensor type, a sensor position, and a scene occlusion for each of the plurality of sensors.

12. The method of claim 11, wherein determining the sensing confidence level comprises:

calculating a Belief of the identification of the same object, using:

$$\text{Belief}_i(R) = \sum_{E_k \subseteq R} p_i(E_k)$$

and calculating a Plausibility of the identification of the same object, using:

$$\text{Plausibility}_i(R) = 1 - \sum_{E_k \cap R = \phi} p_i(E_k)$$

wherein:

i is identification of same object;

R is the observed event;

$E_k$ is the evidence for the observed event; and $p_i(E_k)$ is the observation made by an individual vehicle.

13. The method of claim 12, wherein the plurality of sensors is distributed amongst a plurality of vehicles within the predetermined area; and the method further includes:

determining a historical credit score for each of the plurality of vehicles, wherein the historical credit score of a particular vehicle is based on a confirmed accuracy in prior information sourced from the particular vehicle;

determining a weight function $W_i(R)$ as a joint function of the scene context and the historical credit score.

14. The method of claim 13, further comprising calculating a probability mass function (PMF) using:

$$PMF_{(i,j)}(R) = \frac{\text{Belief}_{(i,j)}(R)}{\text{Plausibility}_{(i,j)}(R)}$$

wherein:

PMF$_{(i,j)}$(R) is the generated PMF function for the event that is the union of all original observed events by vehicle i and vehicle j.

15. The method of claim 13, further comprising calculating a probability mass function (PMF) using:

$$PMF_{(i,j)}(R) = \frac{\sum_{E_k \cap E_N = R} W_{ij} p_i(E_k) p_j(E_N)}{1 - \sum_{E_k \cap E_N = \phi} W_{ij} p_i(E_k) p_j(E_N)}$$

wherein:

PMF$_{(i,j)}$(R) is the generated PMF function for the event that is the union of all original observed events $E_k$ and $E_N$ by vehicle i and vehicle j, $E_k$ and $E_N$ are the evidence for the different observed events, $p_i(E_k)$ and $p_j(E_N)$ are the observation made by vehicle i and vehicle j respectively, $W_{ij}$ is the weighted factor to jointly reflect the weight of opinions by vehicle i and vehicle j, The weight of opinion by a single vehicle is determined by its own historical 'credit score' and context relevance factor, $\Sigma_{E_k \cap E_N = R} W_{ij} p_i(E_k) p_j(E_N)$ represents mutually supporting evidence, the belief value, and $1 - \Sigma_{E_k \cap E_N = \phi} W_{ij} p_i(E_k) p_j(E_N)$ represents the probability of evidence not against the observed events, the plausibility.

16. A system for reconciliation of map information, comprising:
at least one vehicle comprising:
at least one exterior sensor configured to gather information on an area surrounding the vehicle;
a detection module configured to process the gathered information to detect a same object, and identify the same object;
an onboard module configured to determine a confidence level of the identity of the same object; and
a context module configured to determine a scene context for the at least one exterior sensor; and
a communication system configured to transmit the confidence level of the identity of the same object and the scene contexts; and
a conflict resolution module configured to receive a plurality of confidence levels of identifications of the same object and scene contexts from a plurality of vehicles and determine a reconciled identification of the same object using an algorithm based on Dempster-Shafer Theory, wherein the algorithm is weighted based on the scene contexts.

17. The system of claim 16, wherein the scene context comprises at least one of a time of observation, a location, an environmental factor, a sensor type, a sensor position, and a scene occlusion for the at least one exterior sensor.

18. The system of claim 17, further comprising a weight calculation module configured to apply a weight function based on the determined scene context.

19. The system of claim 17, further comprising a weight calculation module configured to apply a weight function based on the determined scene context and a historical credit score of the at least one vehicle.

20. The system of claim 19, wherein the conflict resolution module is a cloud-based server.

* * * * *